June 14, 1927.  
F. R. YEARY ET AL  
OIL FRICTION BRAKE  
Filed April 6, 1926

1,632,425

Inventor  
Fred R. Yeary  
Don E. Yeary  
by Hazard and Miller  
Attorneys

Patented June 14, 1927.

1,632,425

UNITED STATES PATENT OFFICE.

FRED R. YEARY AND DON E. YEARY, OF SANTA ANA, CALIFORNIA.

OIL FRICTION BRAKE.

Application filed April 6, 1926. Serial No. 100,053.

This invention relates to improvements in brakes.

An object of this invention is to provide an improved hydraulic brake, which is primarily designed to be used upon vehicles, but which may be used for other purposes as well.

Another object of this invention is to provide an improved brake of simple and durable construction, which may be easily applied to vehicles now in use without requiring a reconstruction of the parts of the vehicle.

Figure 1:
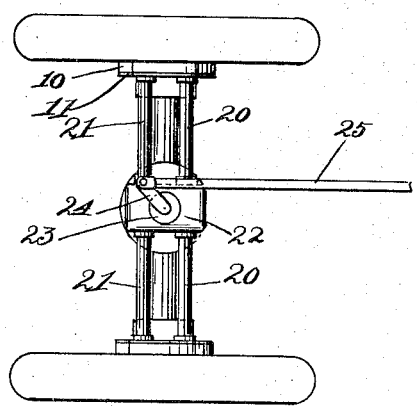
Figure 4:
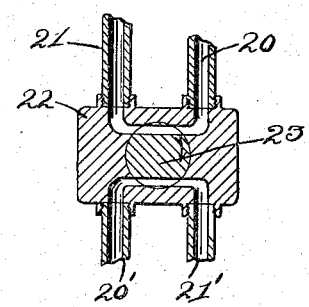
Figure 2:
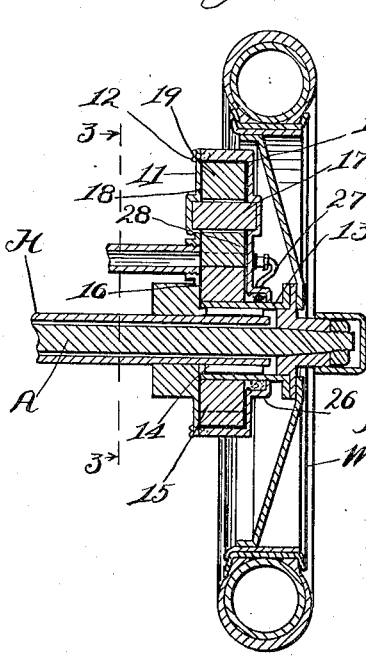
Figure 3:
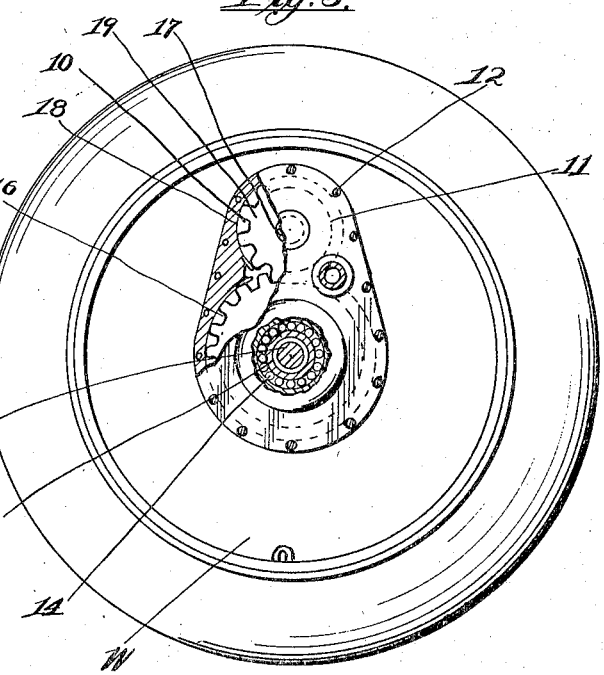

With the foregoing and other objects in view which will be made manifest in the following detailed description and specifically pointed out in the appended claims, reference is had to the accompanying drawings for an illustrative embodiment of the invention, wherein:

Figure 1 is a plan view of two wheels for a vehicle illustrating the improved brake in applied position thereon, Fig. 2 is a vertical section through one of the wheels and through the brake, Fig. 3 is a sectional view taken substantially upon the line 3—3 of Fig. 2, and Fig. 4 is a horizontal section through the valve which controls the operation of the brake.

Referring to the accompanying drawings wherein similar reference characters designate similar parts throughout, the improved brake consists of a housing preferably formed of two parts 10 and 11, which are fastened together by means of screws 12. The two parts 10 and 11 have an aperture therethrough through which the axle housing H of the axle A may extend, and the hub of the part 11 is rigidly fastened to the axle housing H. When the brake is applied to a vehicle, a sleeve 13 is fastened to the wheel W, and this sleeve extends through the aperture in the part 10. The sleeve is separated from the axle housing H by means of roller bearings 14, upon which the sleeve rolls, forming an anti-friction bearing. A gear 15 fits snugly within a circular recess 16 formed in the housing and this gear is rigidly keyed to the sleeve 13. A small shaft or pintle 17 extends across the housing through the center of a circular recess 18 and a pinion 19 which fits snugly within the circular recess 18 is mounted for rotation within the housing by means of this small shaft or pintle. The housing is filled with a fluid, preferably a liquid, and an inlet and an outlet are formed in the housing part 11 on opposite sides of the point of engagement between the pinion 19 and the gear 15. Suitable pipes 20 and 21 connect the inlet and outlet respectively of the brake to a valve 22 having a rotatable stem 23 on which there are formed passages adapted to be brought into registration with the passages in the valve body.

In the case of a vehicle, a brake of the above description is mounted upon each wheel, and as indicated in Fig. 1 pipes 20' and 21' connect the inlet and outlet of the other brake to the valve 22. The stem 23 carries a crank 24 which is pivotally connected to a brake rod 25 adapted to be actuated by the usual brake pedal upon a vehicle.

The operation of the device is as follows: When the brakes are not applied, the valve stem 23 is in that position shown in Fig. 4, so that the pipes 20 and 21 and the pipes 20' and 21' cooperate with the valve 22 in forming by-passes for their respective brakes. In this position, while the wheels W are rotating, the gear 15 is caused to rotate, thus producing rotation of the pinion 19. The rotation of the gear 15 and the pinion 19 produces an action very similar to a gear pump, causing the liquid within the housing, which is preferably oil, to circulate through the by-pass. When it is desired to apply the brakes, the brake rod 25 is actuated and thus the valve stem 23 causes the two by-passes to become partially closed, resisting the flow of fluid through the by-passes. This resistance to the fluid flow through the by-passes tends to resist the rotation of the gear 15 and the gear 19, and as the housing is rigidly secured to the axle housing H, the device will effectively stop or slow down the rotation of the wheel W. As the housing of the brake is held against rotation and the sleeve 13 rotates within it, there is apt to be some leakage of the fluid which is under pressure within the housing between the housing and the sleeve. Consequently, a retaining cap 26 is provided which fits snugly around the sleeve 13 and which is secured to the housing. This retaining cap will collect the oil or fluid which escapes between the housing and the sleeve 13. The retaining cap 26 is provided with a tube 27 in which there is a check valve 28, which conveys the leaked fluid from the retaining cap 26 to the interior of the housing upon the lower pressure side of the point of engagement between the gear and pinion.

From the above described construction it will be appreciated that a very simple and durable form of brake is provided which is very similar to a gear pump operable by the wheels of a vehicle and serving to pump a fluid through a by-pass, and that means is provided for opening and closing the by-pass to permit free rotation of the pump or to prevent its rotation. By arrangement of the valve stem 23, the pipes 20 and 20' may be placed in communication with each other when the valve is closed, and this will also place the pipes 21 and 21' in communication with each other. In this manner when the brakes are applied, the pressures developed within the pipes 20 and 20' will become equalized and the pressures developed within the pipes 21 and 21' will become equalized so that there will be an equal braking action on both wheels. Obviously, the same idea may be extended to a vehicle having brakes on all four wheels, causing the brakes on all four wheels to be applied equally.

It will be understood that various changes may be made in the detail of construction without departing from the spirit or scope of the invention as defined by the appended claims.

We claim:

1. A vehicle brake comprising a housing mounted upon the axle of the vehicle and held against rotation thereon, a gear rotatable within the housing and connected to a wheel of the vehicle so as to be driven thereby, a pinion rotatable in the housing and meshing with the gear, a fluid in the housing, means providing a by-pass having its ends connected to the housing upon opposite sides of the point of engagement between the gear and pinion, means for opening and closing said by-pass, and means for collecting fluid which may leak from said housing and returning it to the interior of the housing.

2. In a vehicle, means providing two gear pumps, the housings of which are held against rotation and which are driven respectively by two wheels of the vehicle, means providing a by-pass for each pump leading from its outlet to its inlet, and means for opening and closing said by-pass, said means placing the outlets of the pumps and the inlets in communication with each other when the by-passes are closed so as to equalize the brakes substantially as shown.

3. In a vehicle, a brake comprising two gear pumps, each of which is adapted to be driven by a wheel of the vehicle, means providing a passage connecting the outlet from each pump to its inlet, and unitary means for simultaneously opening and closing said passages.

4. In a vehicle, a brake comprising two gear pumps, each of which is adapted to be driven by a wheel of the vehicle, means providing a passage connecting the outlet from each pump to its inlet, unitary means for simultaneously opening and closing said passages, and means for equalizing the pressures in the passages while the pumps are undergoing braking action.

In testimony whereof we have signed our names to this specification.

F. R. YEARY.
DON E. YEARY.